United States Patent

Horikawa et al.

Patent Number: 5,774,130
Date of Patent: Jun. 30, 1998

[54] COMPUTER ANIMATION GENERATOR CREATING HIERARCHIES OF MODELS FOR RAPID DISPLAY

[75] Inventors: Junji Horikawa, Tokyo; Takashi Totsuka, Chiba, both of Japan

[73] Assignee: Sony Corporation, Japan

[21] Appl. No.: 521,759

[22] Filed: Aug. 31, 1995

[30] Foreign Application Priority Data

Sep. 8, 1994 [JP] Japan .................................... 6-240646

[51] Int. Cl.⁶ .................................................. G06T 3/40
[52] U.S. Cl. ...................... 345/441; 345/428; 345/429; 345/439; 345/473; 382/260; 382/263
[58] Field of Search ..................................... 395/141, 118, 395/128, 129, 173, 175, 139; 382/263, 264, 260, 265; 352/141, 128, 129, 173, 175

[56] References Cited

U.S. PATENT DOCUMENTS

| | | | |
|---|---|---|---|
| 4,152,766 | 5/1979 | Osofsky et al. | 395/141 |
| 4,600,919 | 7/1986 | Stern | 395/175 |
| 4,694,407 | 9/1987 | Ogden | 395/141 |
| 4,783,829 | 11/1988 | Miyakawa et al. | 382/199 |
| 4,969,204 | 11/1990 | Melnychuck et al. | 382/240 |
| 5,029,228 | 7/1991 | Nonoyama et al. | 382/305 |
| 5,276,786 | 1/1994 | Long et al. | 395/128 |
| 5,341,466 | 8/1994 | Perlin et al. | 395/139 |
| 5,373,375 | 12/1994 | Weldy | 358/523 |
| 5,384,904 | 1/1995 | Sprague et al. | 395/139 |
| 5,448,686 | 9/1995 | Borrel et al. | 395/128 |
| 5,490,239 | 2/1996 | Myers | 395/129 |
| 5,613,051 | 3/1997 | Iodice et al. | 395/128 |

OTHER PUBLICATIONS

Francis J.M. Schmitt, et al., "An Adaptive Subdivision Method for Surface–Fitting from Sampled Data", Computer Graphics, vol. 20, No. 4, Aug. 1996.

Primary Examiner—Joseph H. Feild
Assistant Examiner—Jae-Hee Choi
Attorney, Agent, or Firm—Ronald P. Kananen

[57] ABSTRACT

A drawing method of computer graphics in which an approximation of a model is executed in consideration of a target point of the observer, a position of model, a size of model on a picture plane, and a moving speed of model are considered and, further, a feeling of physical disorder that is given to the eyes of a human being is reduced is provided. Geometric model data inputted in step S1 is subjected to a filtering process in order to reduce a complexity of the model in step S2 and an outline of the model is extracted in step S3. As for the model from which the outline was extracted, characteristic points to which the human being largely react are extracted from such an outline in step S4. The processes in steps S2 to S4 are executed by a number of times as many as the number of necessary hierarchies (step S5). The characteristic points extracted every hierarchy in step S4 are made correspond among the hierarchies in step S6. The geometric model in a proper hierarchy is selected from the hierarchical approximated models obtained by the procedure in steps S2 to S6 in accordance with a state of the input geometric model in step S7. The selected geometric model is drawn as a computer graphics picture plane in step S8.

21 Claims, 10 Drawing Sheets

SHAPE OF ORIGINAL

Fig. 3B

SHAPE (OUTLINE) OBTAINED BY EXECUTING
SPATIAL FILTERING PROCESS

Fig. 4A

OUTLINE AND CHARACTERISTIC POINT

Fig. 4B

● : CHARACTERISTIC POINT AT WHICH EXTREMAL VALUE OF ANGLE CHANGE OR ACCUMULATION IN INTERVAL OF ANGLE CHANGE EXCEEDS A PREDETERMINED VALUE

BROKEN LINE : THRESHOLD VALUE

ANGLE CHANGE AND CHARACTERISTIC POINT

Fig. 5

• :CHARACTERISTIC POINT   ◄---► :CORRESPONDING RELATION OF POINT

COMPUTER ANIMATION GENERATOR CREATING HIERARCHIES OF MODELS FOR RAPID DISPLAY

BACKGROUND OF THE INVENTION

1. Field of the Invention

The present invention relates to a drawing method of a geometric object in computer graphics (CG) and, more particularly, to a drawing method of a geometric object in CG when it is necessary to draw a large amount of data in a game or a virtual reality (VR) using CG or a computer aided design (CAD) at a high speed.

2. Description of the Related Art

In CG, when a drawing is performed by using geometric objects which have already been created, the drawing is generally executed by using the existing objects. For example, when the geometric object to be drawn is located far from the vantage point of an observer, the stocked geometric object is reduced and drawn. When the geometric object is located near the vantage point of the observer, the geometric object is enlarged and drawn. Consequently, the time necessary for generating the CG drawing largely depends on the complexity of the object (the number of vertexes, the number of planes, and the number of normal lines). The time necessary for the reducing and enlarging processes becomes long as the model becomes complicated, so that the time necessary for generating the drawing becomes long.

In order to finish the drawing within a limited time, therefore, it is possible to replace a geometric model with a simpler model of a lower picture quality. On the contrary, the user wants to use a more complicated geometric model for a higher picture quality. The need for high speed drawing and the need for high quality drawing, however, are contradictory.

On the other hand, when a visual effect of a human being is considered, there is no need to draw by using the same detailed model.

For example, when the model is located far from the vantage point of the observer, a size of model on the picture plane is small and the details of the model cannot be seen. When the model is located near the vantage point of the observer, on the contrary, the size of model on the picture plane is large and the more details of the model are needed. Instead of always using the same model at the time of the drawing, accordingly, there is an alternate method of switching the model that is used for drawing in accordance with a target point of the observer or the size of model in the picture plane. That is, the models having different complexities are formed and switched in accordance with the location or size of the model in the picture plane or the target point of the observer.

Since an approximating work of changing the complexity of the original model and forming further another model is largely executed by manually a designer under the present situation, a long Lime and a lot of trouble are necessary to form another model. In the approximation such that data of the model as an original is simply reduced, there is a problem such that when the drawing is executed by using the approximated model, a feeling of physical disorder is given to the observer. Therefore, it is necessary to approximate so as to reduce the feeling of physical disorder.

As far as the inventor of the present invention knows, the approximation in which the feeling of physical disorder is considered is not conventionally executed. There is also no attempt to approximate the original model in consideration of the target point of the observer, the position and size of the model, and further a moving speed of the model. In the past studies, a technique such that Bezier patches are stuck to a three-dimensional shape, thereby approximating and drawing the shape has been proposed in Francis J. M. Schmitt, Brian A. Barsky, and Wen-Hui Du, "An Adaptive Subdivision Method for Surface-Fitting from Sampled Data", Computer Graphics, Vol. 20, No. 4, August 1986. According to such a method, however, a general polygon is not used as a target and, moreover, the feeling of physical disorder given to the eyes of the human being when approximating is not considered.

As mentioned above, in CG drawing of the prior art, a method in which the same model is always used and the model is enlarged or reduced in accordance with a distance from the vantage point of the observer is known. Or, a method whereby a plurality of drawing models are prepared and switched to correspond to the distance from the vantage point of the observer is known.

In case of those methods, the approximation of the model in which the position, size, and even the moving speed of the model are considered is not executed. In the approximation of the model, a method in which a consideration is made so that the observer feels the physical disorder as little as possible is not also used.

OBJECTS AND SUMMARY OF THE INVENTION

An object of the invention is to provide a drawing method of CG, which enables a drawing at a high speed to be performed.

Another object of the invention is to provide a drawing method of CG, which enables a drawing of a high picture quality to be executed.

Further another object of the invention is to provide a drawing method of CG, whereby an approximation of a model is executed in consideration of a target point of the observer, a position of model, a size of model on a picture plane, and a moving speed of the model and a feeling of physical disorder given to the eyes of a human being is reduced in the approximated drawing image.

In order to solve the above-mentioned problems, the invention is accomplished by a drawing method using a hierarchical approximating method of figure data, comprising the steps of: inputting geometric model data; hierarchically approximating the input geometric model data; making characteristic points of hierarchies correspond to the geometric model data which was hierarchically approximated; selecting the hierarchy which was hierarchically approximated; and drawing the input geometric model data corresponding to the selected hierarchy or the geometric model data that was hierarchically approximated.

In the above drawing method using the hierarchical approximating method of the figure data, the step of hierarchically approximating the input geometric model data comprises the steps of executing a spatial filtering process to the input geometric model, extracting an outline from the geometric model data which was subjected to the spatial filtering process, and extracting the characteristic points from the geometric model data from which the outline was extracted, wherein the step of executing the spatial filtering process, the step of extracting the outline, and the step of extracting the characteristic points are repeated a number of times equal to the number of necessary hierarchies.

According to the above drawing method, in the step of extracting the characteristic points, an angle change of the outline is used.

According to the above drawing method, in the step of selecting the hierarchy that was hierarchically approximated, the hierarchy is selected in accordance with a position and a size of the input geometric model data in a display picture plane, a target point in the display picture plane, and a moving speed.

According to the above-mentioned construction, in the approximation of the geometric model data, since the approximation is executed while keeping the characteristic points of the model, the feeling of physical disorder of the observer can be suppressed in an actual drawing image. The approximation of the model is performed in accordance with the position and size of the input geometric model data in the display picture plane, the target point in the display picture plane, and the moving speed, so that the drawing of a high picture quality can be performed at a high speed.

The above and other objects and features of the present invention will become apparent from the following detailed description and the appended claims with reference to the accompanying drawings.

DETAILED DESCRIPTION OF THE PREFERRED EMBODIMENT

A concept and an embodiment of the invention will be described hereinbelow in accordance with the following order with reference to the drawings.

Figure 1:
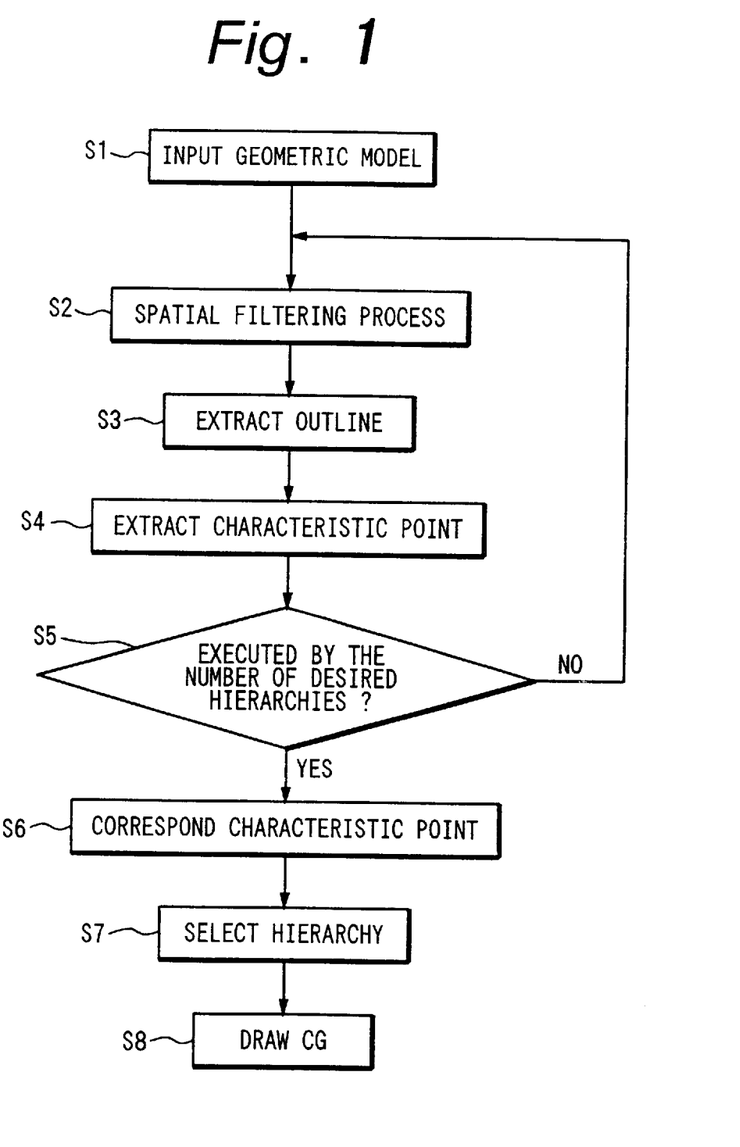
FIG. 1 is a flowchart showing an outline of the invention.

(1) Description of a whole flowchart showing an outline of the invention (2) Description of steps S2 and S3
(3) Description of step S4
(4) Description of step S6
(5) Description of step S7
(6) Description of an embodiment of the invention (1) Description of a whole flowchart showing an outline of the invention FIG. 1 is a flowchart showing an outline of the invention. In step S1, geometric models which are used in CG are inputted. Processes in subsequent steps S2 to S4 are processes for approximating hierarchies. The "hierarchy" here denotes variations in a geometric model to be drawn which is effected by a change in position, size, and moving speed. Changes in the model on a drawing picture plane from a target point of the observer are captured step by step. Those hierarchies, therefore, can be regarded as a plurality of discrete geometric models. The processes in steps S2 to S4 are executed every foregoing hierarchy, thereby approximating the model for a plurality of desired hierarchies.

Geometric model data inputted in step S1 is subjected to a filtering process in step S2 in order to reduce a complexity of the model and the details of the model are eliminated, thereby obtaining a blur shape. An outline of the model which was subjected to the filtering process is extracted in step S3. In step S4, as for the model from which the outline was extracted, characteristic points which are strongly perceived by the human observer are extracted from the extracted outline. As mentioned above, the processes in steps S2 to S4 are executed for every hierarchy. The geometric models obtained by those steps are called hierarchical approximated models.

In step S6, a process is executed to make the characteristic points extracted from every hierarchy in step S4 correspond among the hierarchies. The process for making the correspondence is generally known as an interpolation. For example, a process for obtaining an intermediate pixel by a method of obtaining an added mean of corresponding pixels of two images which are preceding and subsequent with respect to the space or time or the like is known. An intermediate shape of those discrete hierarchies can be obtained by such a process. By weighting in dependence on distances from the two preceding and subsequent images, not only the intermediate image but also a plurality of images between the two images can be obtained.

A plurality of geometric models in a range from a shape of an input original geometric model to a most simplified shape can be almost continuously obtained by the processes in steps S2 to S6.

Among those hierarchical approximated models obtained by the procedure in steps S2 to S6, in step S7, one geometric model of a proper hierarchy is sequentially selected in accordance with a state of the input geometric model which is displayed, namely, components such as position, size, and moving speed of the model on the display picture plane, target point of the observer, and the like.

Figure 2:
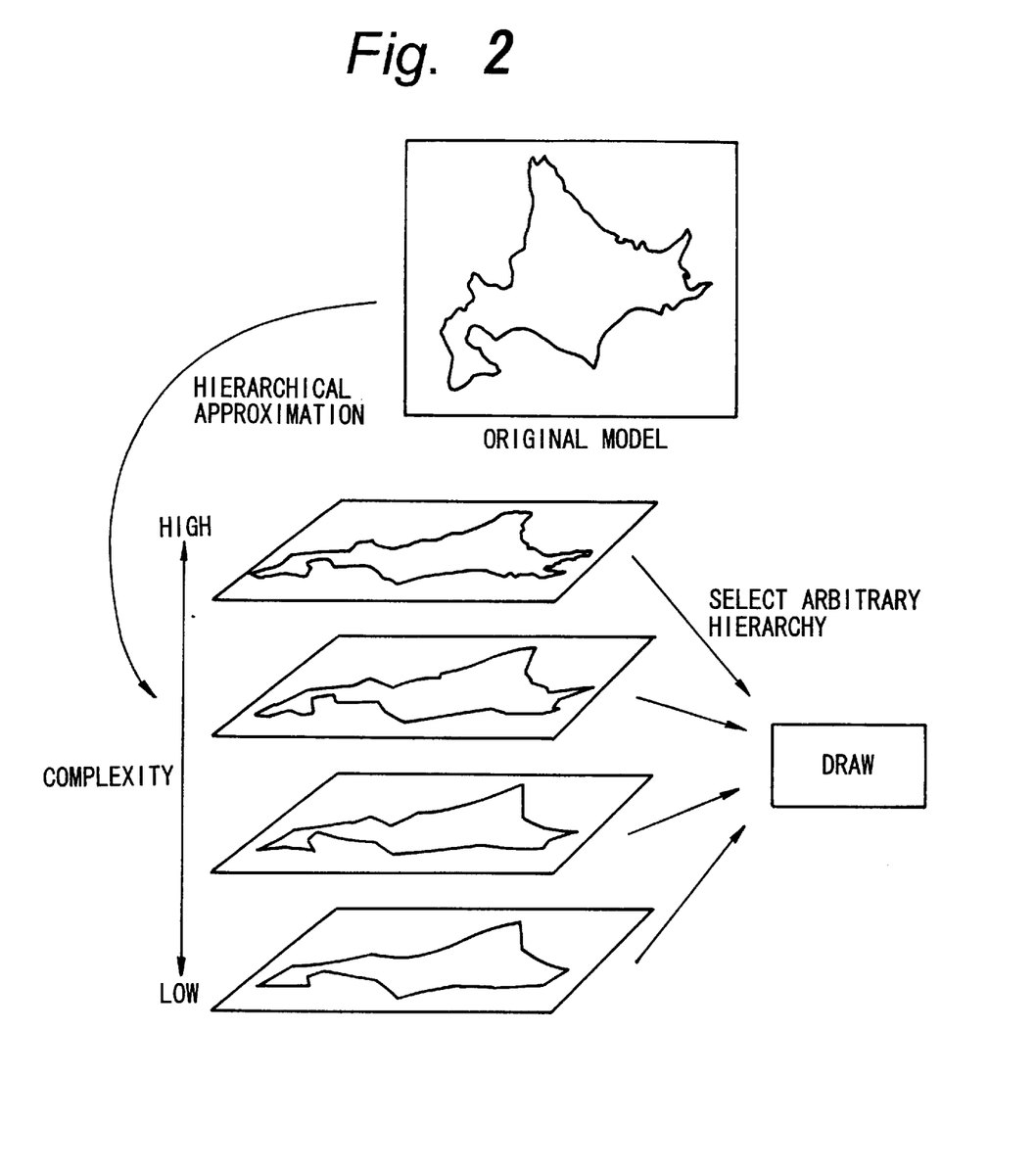
FIG. 2 is a schematic diagram showing a concept of the invention.

The selected geometric model is drawn as a CG picture plane in step S8. FIG. 2 is a conceptual diagram of the above processes in steps S1 to S8.

(2) Description of steps S2 and S3

Figure 3A:
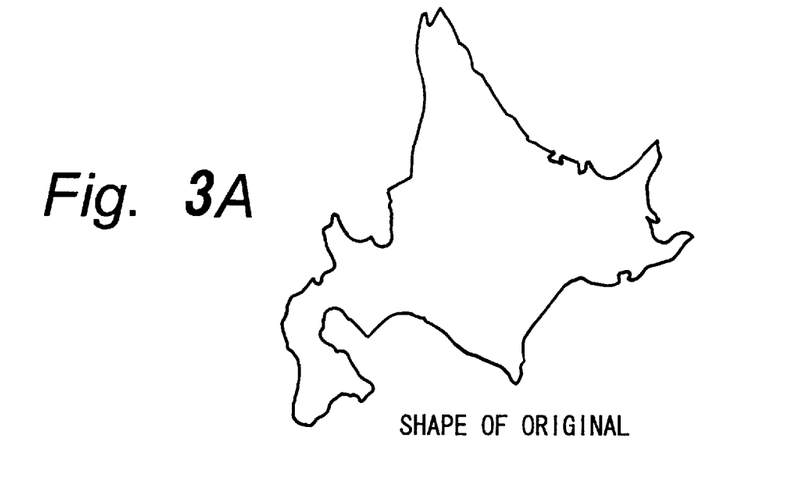
FIG. 3A is a diagram showing an example of an original geometric model.

Steps S2 and S3 in the foregoing flowchart of FIG. 1 will be described with reference to the drawings. The geometric model inputted in step S1 assumes, for example, a figure as shown in FIG. 3A. In step S2, in order to reduce a complexity of the shape of such a geometric model, the geometric model is subjected to a filtering process by a spatial filter having characteristics of a low-pass filter. By such a process, complicated portions of the shape of the model of FIG. 3A having a fine structure are reduced, thereby obtaining, for example, a shape drawn by a hatched portion in FIG. 3B. For explanation, the outline obtained in next step S3 is also shown. The shape obtained by reducing the complexity of the model is called a large view shape.

When the above-mentioned filtering process is performed, a degree of reduction of the complexity can be changed by changing a cut-off frequency of the spatial filter. That is, by setting the cut-off frequency to a lower value, the shape can be changed to a simpler shape. As mentioned above, the large view shape which differs depending on the hierarchy can be obtained in step S2.

For example, the spatial filter having the characteristics of the low-pass filter is constructed on the basis of the Gaussian function. In this case, the filtering process is executed by a convolution with the Gaussian function. In case of obtaining the large view shape by the convolution with the Gaussian function, by changing a spatial extent of the Gaussian function which executes the convolution, the hierarchy forming process is performed.

As mentioned above, the large view shape of a predetermined hierarchy is outputted in step S2.

Figure 3B:
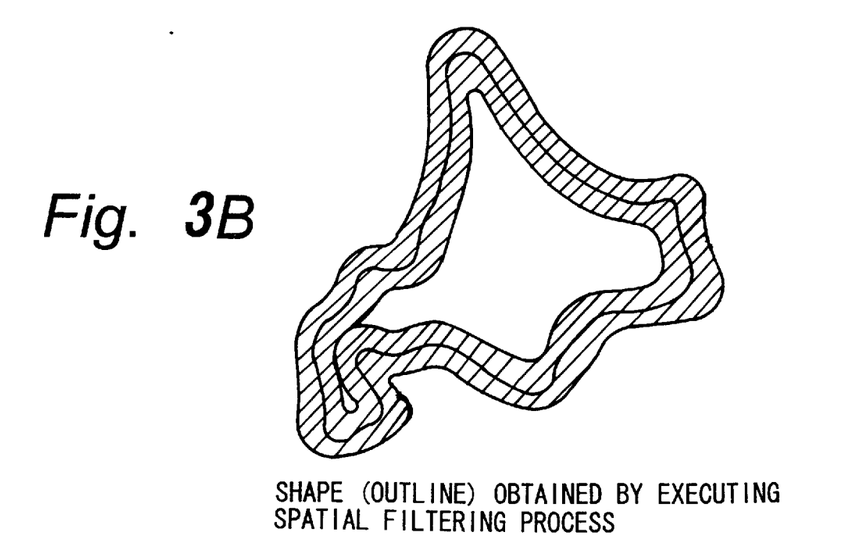
FIG. 3B is a schematic diagram for explaining an example in which a spatial filtering process is performed to an original figure, thereby obtaining an outline.

In step S3, an outline of the large view shape obtained in step S2 is extracted. As a method of obtaining the outline, for example, a process for tracing the outer circumference of the half values of density distribution or the like is executed. FIG. 3B shows an outline extracted by such a method.

As mentioned above, in step S3, the outline is extracted from the large view shape obtained in step S2.

(3) Description of step S4

Step S4 in the flowchart of FIG. 1 will now be described with reference to the drawings. In step S4, characteristic points of the figure are extracted from the outline of the large view shape obtained in steps S2 and S3. The characteristic points denote portions which the human observer strongly perceives for such a shape.

Generally, the characteristic points of a curve are considered to be an intersection point, an edge point, a gap, and a portion having a large curvature of a curve. Among them, it is recognized that the portion having a large curvature is important. That is, the characteristic points on the outline of the large view shape are the above-mentioned points. Among the characteristic points, especially, the portion having the large curvature is considered to have a large information amount. In step S4, therefore, the characteristic points are extracted by specifying the portion of the large curvature.

For this purpose, while tracing the outline obtained in step S3, continuous angle changes of the tangent line of such an outline are checked. The portion having a large angle change is, namely, the portion having the large curvature. Therefore, when a certain threshold value is set for the angle change and an extreme value of the angle change obtained by tracing the outline exceeds the set threshold value, such a portion is extracted as a characteristic point.

According to the above method, however, although the portion having a sharp angle change can be extracted, a curved portion which has a large radius and continues long and gentle cannot be extracted. Therefore, the accumulation of the angle changes in an area where the same sign (+ or −) of the angle change continues is calculated and the area where such an accumulation exceeds a certain predetermined value is regarded as a long gentle curve portion. In an area such that the accumulation exceeds the predetermined value, namely, in the area where it is the long gentle curve portion, and in an area such that the extremal value of the above-mentioned angle change doesn't exceed the predetermined value, a portion having the half value of the accumulation value is extracted as a characteristic point. The reason why the characteristic point is determined from either one of the extreme value of the angle change in the area on the accumulation of the angle changes is to prevent a characteristic point from being extracted twice from the same area.

Figure 4A:
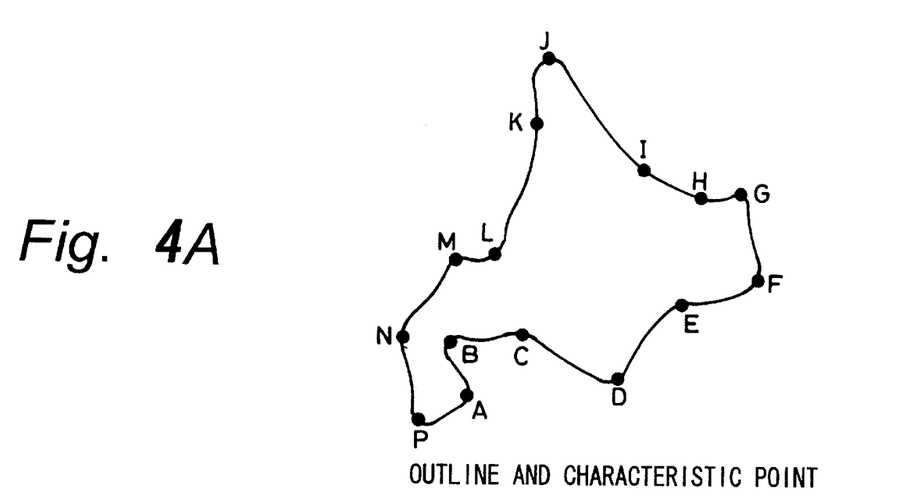
FIG. 4A is a schematic diagram for explaining the correspondence with characteristic points on the outline.
Figure 4B:
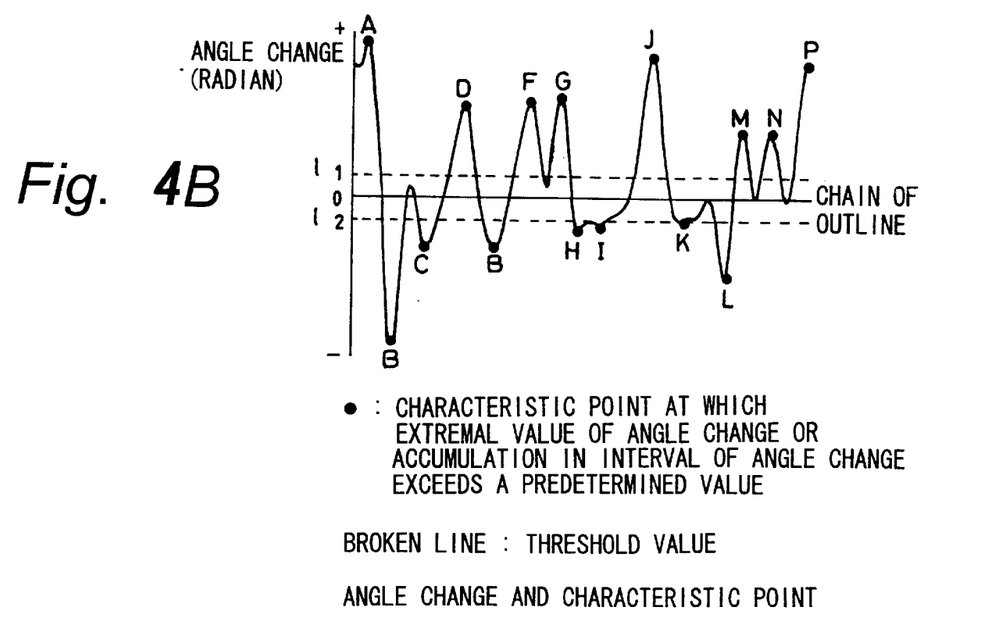
FIG. 4B is a schematic diagram for explaining the correspondence between the characteristic points and the angle change.

FIGS. 4A and 4B show an example in which the figure of FIG. 3B is traced by the above method and the characteristic points of such a figure are extracted. According to the example, in FIG. 4A, the outline is traced counterclockwise from a point (P) serving as both of a start and an end point. Angle changes in this instance are shown in FIG. 4B. In FIG. 4B, reference numerals $l_1$ and $l_2$ denote threshold values of the foregoing angle change. When the extreme value of the angle change exceeds the foregoing threshold values or when the accumulation value of the angle change of the same sign exceeds a certain predetermined value, such a point is extracted as a characteristic point.

Points (A) to (N) and (P) in FIG. 4B correspond to points (A) to (N) and the point (P) in FIG. 4A, respectively. Those are the points extracted respectively as characteristic points.

Among those points, the point (K) is the characteristic point when the accumulation value of the angle changes of the same sign exceeds the certain predetermined value and the other points are the characteristic points when the extreme values of the angle changes exceed the threshold values.

It is now assumed that, as a rule, the positional relations don't change among the hierarchies with respect to the characteristic points. Especially, since the position changes of the characteristic points (A, B, D, F, G, J, L, and P) each having a sharp angle change are easily perceived, their positional relations are held as much as possible. It is generally known that the characteristic points of the outline of the large view shape obtained by the spatial filter are moved to the center since such an outline has a nature such that it is pulled to a large area portion. The feeling of physical disorder is suppressed by correcting the characteristic points so as to match with the characteristic points of a hierarchy which is close to the original.

(4) Description of step S6

Step S6 in the above flowchart of FIG. 1 will now be described with reference to FIG. 5. In the flowchart of FIG. 1, the above mentioned procedure in steps S2 to S4 is executed a number of times equal to the number of desired hierarchies (step S5). Thus, the desired number of geometric models which were approximated for every hierarchy and from which the characteristic points were extracted can be obtained.

As mentioned above, however, those hierarchies are discrete. Therefore, when those discrete hierarchies of the model are made to correspond to the distance or size of the model which continuously changes, a feeling of physical disorder is given to the observer. The feeling of physical disorder actually denotes a phenomenon such that when a figure which is far (small) is continuously changed to a figure which is near (large), the outline is swung and it is actually perceived as if the FIG. danced.

In order to eliminate such a feeling of physical disorder, in step S6, the characteristic points extracted from every hierarchy are made to correspond among the hierarchies so that the hierarchy can be smoothly moved to the different hierarchy. By making the characteristic points correspond among the hierarchies, the characteristic points of a virtual hierarchy between the two existing hierarchies can be obtained by an interpolation between the two existing hierarchies.

The characteristic points are made to correspond among the hierarchies by judging the spatial positions of the characteristic points extracted from every hierarchy when the hierarchies are spatially arranged and the signs of the angle changes when the characteristic points are extracted. FIG. 5 shows such a method of establishing correspondence.

First, two adjacent hierarchies are presumed. In the characteristic points in the respective hierarchies, points which are the closest points on planes of the hierarchies and in which the signs of angle change coincide are searched. For example, in hierarchies (N) and (N+1) in FIG. 5, the points (A and E), the points (B and F), the points (C and G), and the points (D and I) satisfy the above conditions. When the characteristic points have been made to correspond among the hierarchies as mentioned above, the positions of the characteristic points on the intermediate hierarchy are regarded as the same positions as those of the hierarchies (N) and (N+1).

Figure 5:
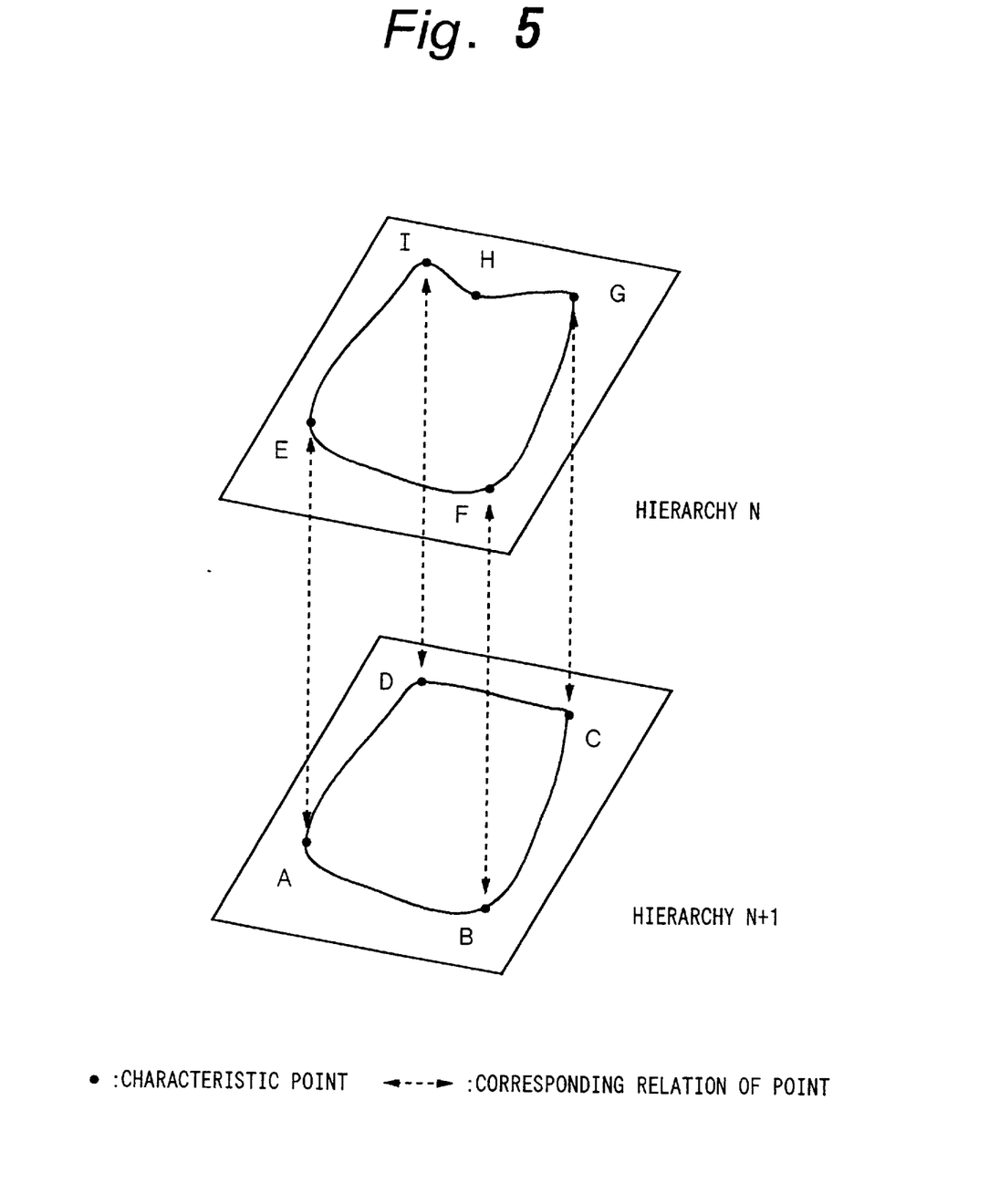
FIG. 5 is a schematic diagram for explaining the correspondence of the characteristic points among different hierarchies.

The hierarchy (N) doesn't have a point corresponding to the point (H) on the hierarchy (N+1) in FIG. 5. With respect to a point which was not made to correspond among the hierarchies like the point (H), the nature of the point as a characteristic point is classified and the position on the intermediate hierarchy is determined. The nature of the characteristic point is classified into the following two kinds of points. One is a point derived from a vertex and the other is a point generated on a side.

Figure 6A:
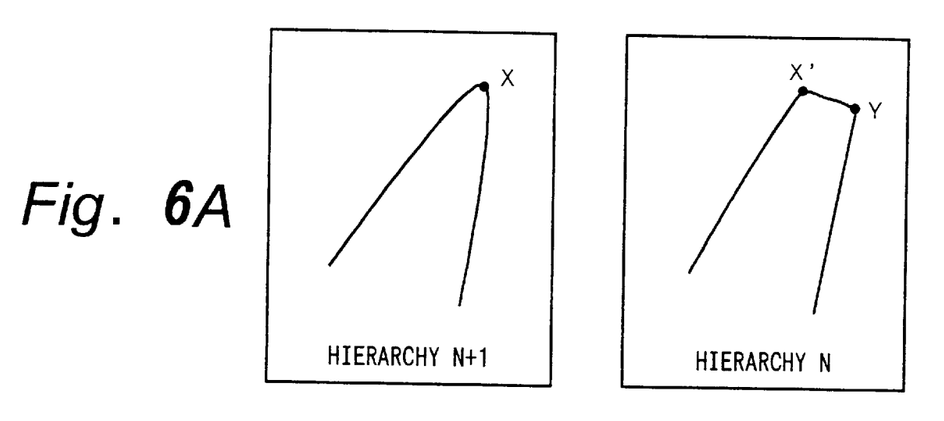
FIG. 6A is a schematic diagram for explaining the characteristic points derived from a vertex.
Figure 6B:
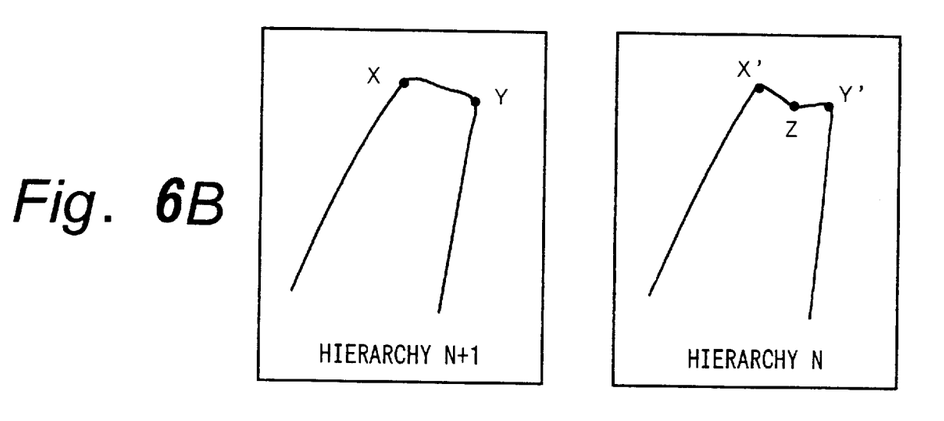
FIG. 6B is a schematic diagram for explaining the characteristic points derived from a side.

FIGS. 6A and 6B are diagrams for explaining such a classification. FIG. 6A shows an example of the points derived from the vertex. Positions of a point (X) in the hierarchy N+1 and a point X' on the hierarchy (N) are located very near on a two-dimensional plane. The signs of angle changes also coincide. That is, each of the points exists in a portion in which the shape of the outline is convex.

On the contrary, although a point (Y) on the hierarchy (N) is located near the point (X) on the hierarchy N+1, the point (Y) is located at a remote distance as compared with the point (X') on the hierarchy (N). As mentioned above, the point which is not the closest point but is located in a predetermined distance and in which the sign of the angle change coincides is set to the point derived from the vertex.

FIG. 6B shows an example of the points generated on the side. The points (X) and (Y) on the hierarchy N+1 correspond to the point (X') and a point (Y') on the hierarchy (N), respectively. On the hierarchy (N), a point (Z) which is located between the points (X') and (Y') doesn't correspond to any points on the hierarchy N+1. The sign of the angle change of the point (Z) doesn't coincide with the sign of each of the points (X) and (Y) on the hierarchy N+1. That is, although the point (Z) exists in a concave portion of the outline, the points (X) and (Y) exist on the convex portion of the outline.

The point in which the sign of the angle change differs is classified into the point generated from the side.

In case of interpolating a hierarchy between the hierarchies by making the hierarchies correspond, as for the points derived from the vertex, the position of the derivative point is gradually moved from the vertex on the derivative side [for example, the (X) point in FIG. 6A] to the derived vertex [for instance, the (Y) point in FIG. 6A], thereby determining the position of the derivative point on the intermediate hierarchy. This is because attention is paid to a point for which the position changes of the characteristic points near the vertex between the hierarchies are especially easily perceived and a feeling of physical disorder is caused.

The position of the point generated on the side is gradually moved from the side connecting two vertexes [for instance, the (X) and (Y) points in FIG. 6B] which construct the side to the derivative point on the side [for example, the (Z) point in FIG. 6B], thereby determining the position of the generation point on the side on the intermediate hierarchy. This is because since the two vertexes constructing the side are strongly perceived, the characteristic points on the side have a nature such that they are concentrated on the line which connects the two points and which indicates the shortest distance between the two points. In other words, in the case where the model is away from the visual point, the adjacent two characteristic points are concentrated on one point while moving the shortest distance.

(5) Description of step S7

Figure 7A:
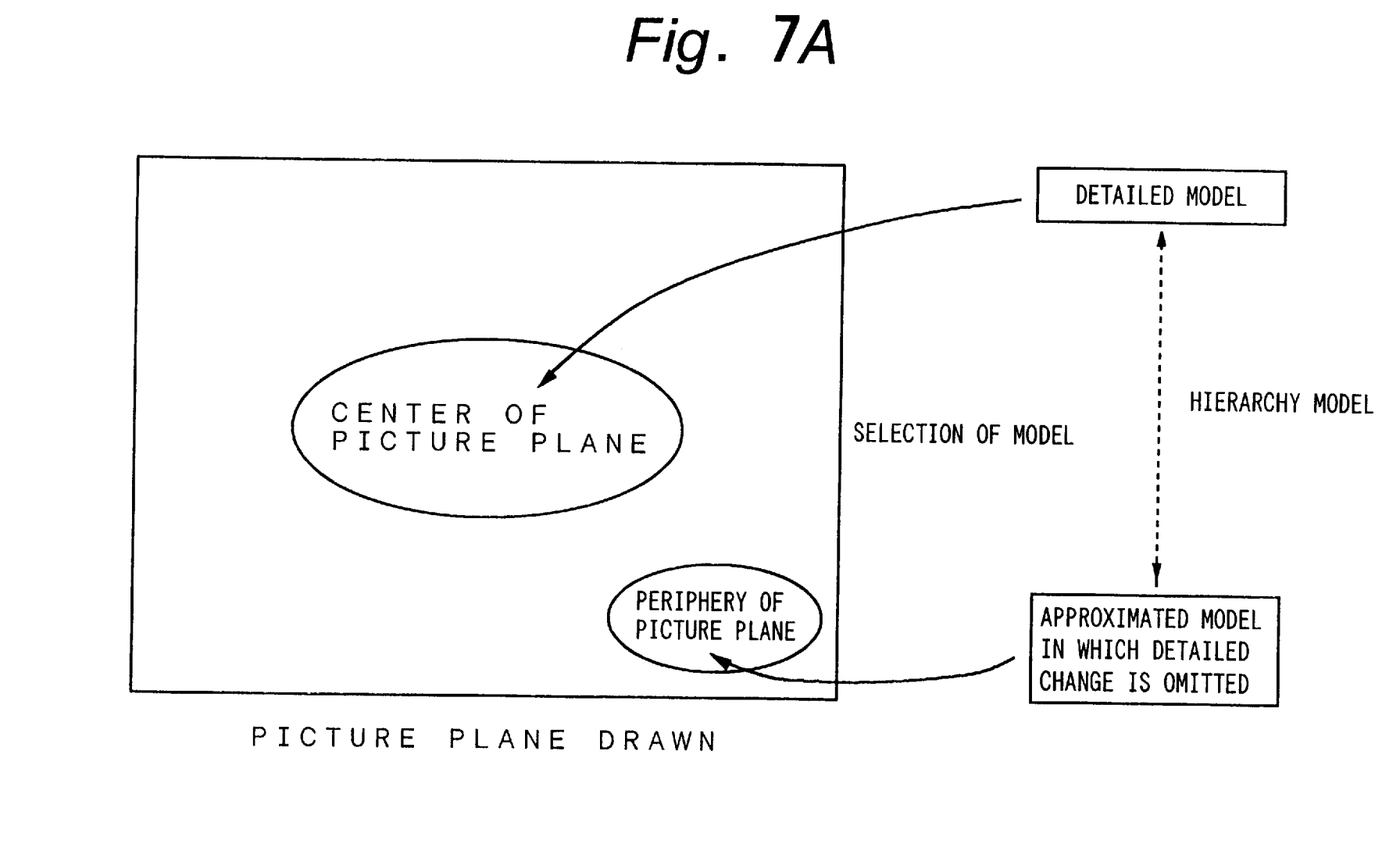
FIG. 7A is a schematic diagram for explaining the selection of a hierarchical approximated model from a position of a geometric model on a picture plane.
Figure 7B:
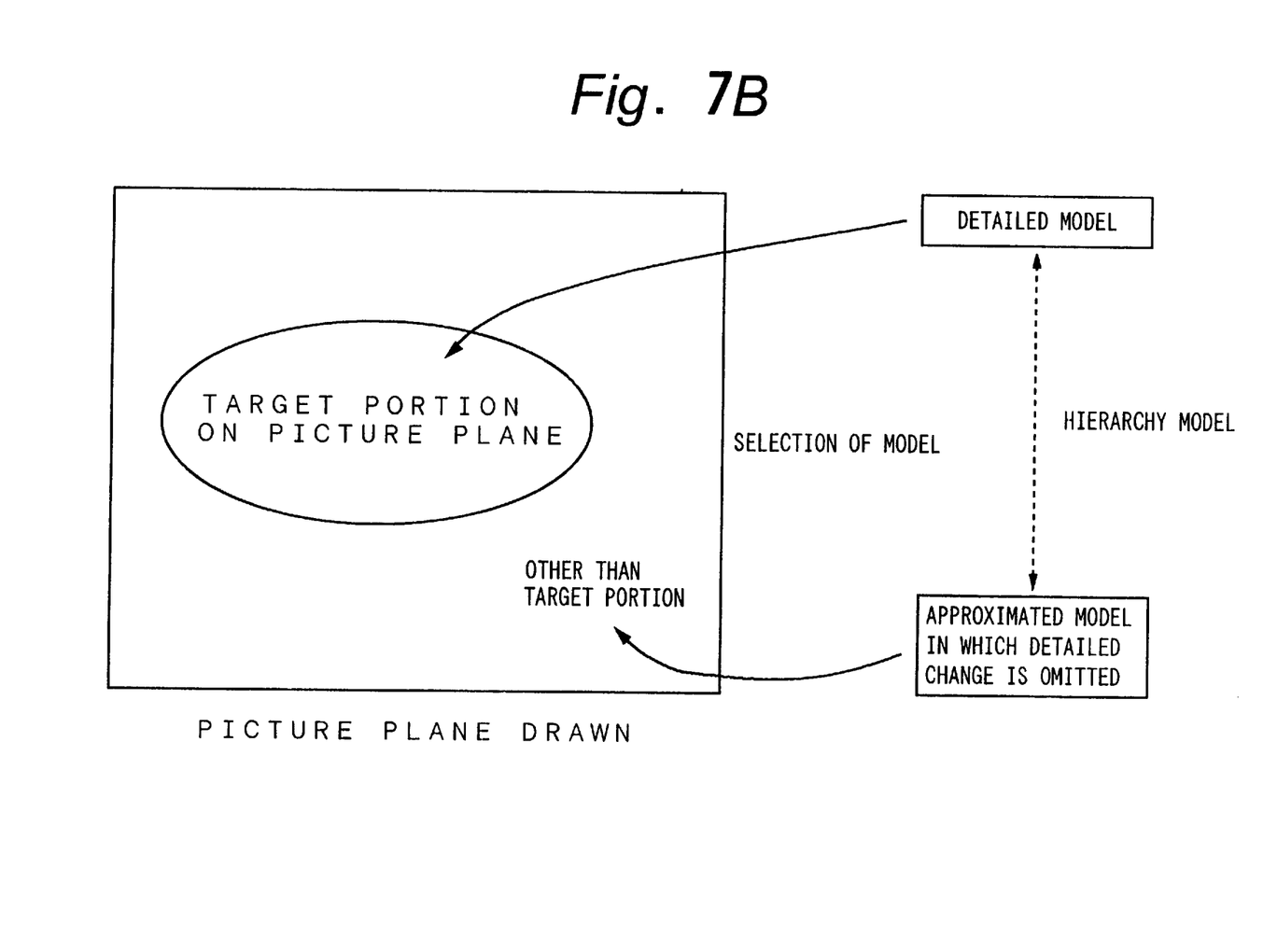
FIG. 7B is a schematic diagram for explaining the selection of a hierarchical approximated model from a target point of the observer of the geometric model.
Figure 7C:
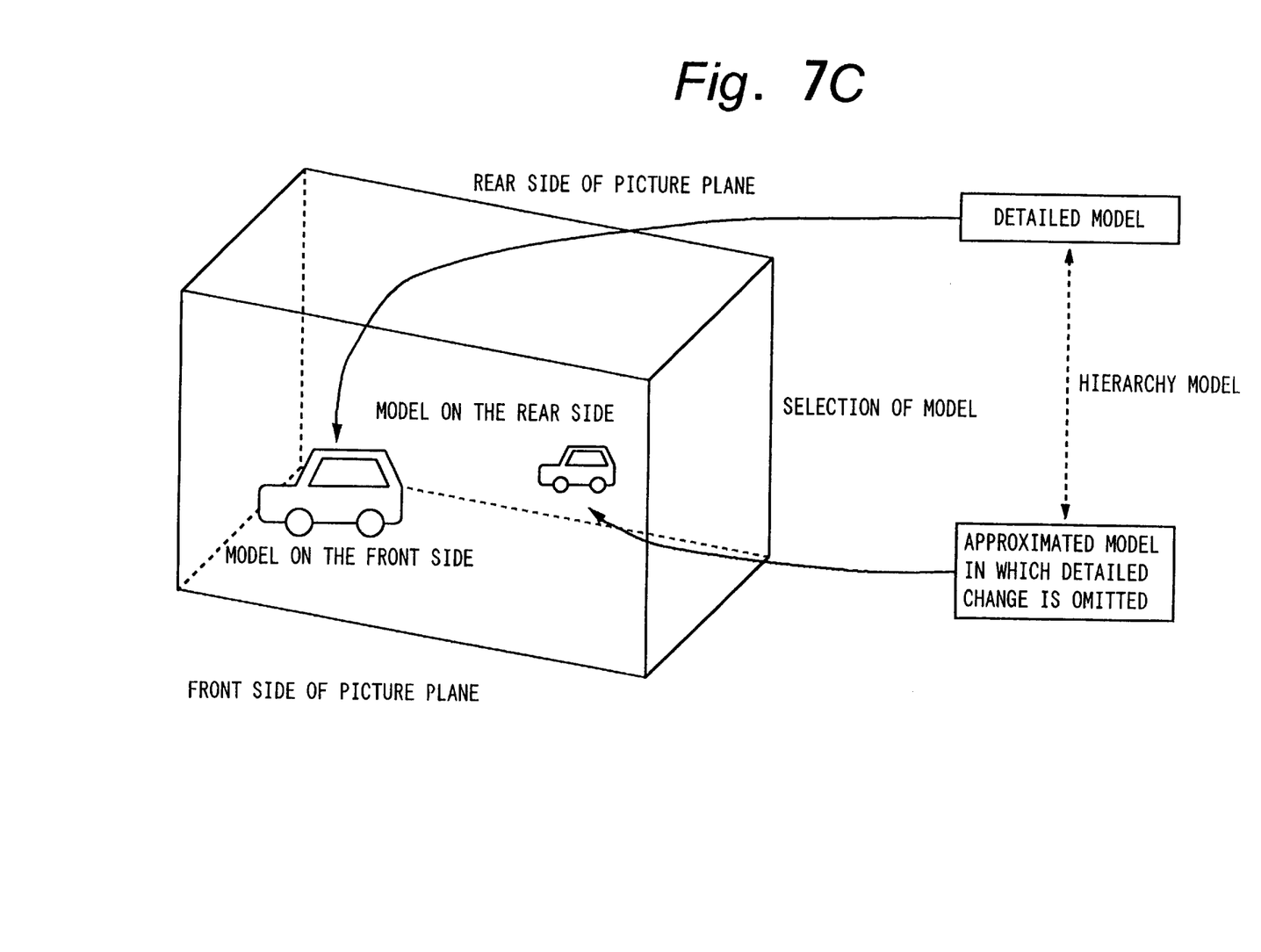
FIG. 7C is a schematic diagram for explaining the selection of a hierarchical approximated model from a size of geometric model on the picture plane.

Step S7 in the foregoing flowchart of FIG. 1 will now be described with reference to the drawings. In step S7, the model at the time of the drawing is selected from the hierarchies among the hierarchical approximated models formed by the steps so far in accordance with the position and size of the model in the picture plane, the target point in the picture plane, and the moving speed of the model. FIGS. 7A to 7C show examples of switching of the models when CG drawing is performed by using the hierarchical approximated model formed.

FIG. 7A shows an example in which the hierarchies are switched depending on the position of the model to be drawn on the picture plane. Generally, the observer has a nature such that he pays attention to the center of the picture plane and a possibility such that an important model exists in the center of the picture plane is high. Therefore, when the position of the model is located at the center of the picture plane at the time of the drawing, a detailed model is used. On the contrary, when the model is located on the periphery of the picture plane, the drawing is executed by using the approximated model obtained by reducing the detailed portions from the original model.

FIG. 7B shows an example such that the hierarchies are switched in accordance with the target point of the observer. In general, a possibility such that a portion having a large change on the whole picture plane or a portion where an important model exists is a portion to which the observer pays an attention is high. Therefore, when the model position in the picture plane is near the target point of the observer, the drawing is performed by using the detailed model. When the position of the model is deviated from the target point, however, the approximated model in which the detailed portions are reduced is used. In this case, the hierarchy can be also chosen in accordance with the distance from the target point.

FIG. 7C shows an example in which the approximated model is selected on the basis of the distances from the model and the visual point. When the model is arranged far from the visual point, the model in the picture plane becomes small, so that a portion of detailed changes are difficult to be seen. On the contrary, in the case where the model is arranged on the front side of the picture plane, the detailed changes can be sufficiently seen in the case where the size of model in the picture plane is small, therefore, the approximated model from which the detailed portions are eliminated is selected. On the contrary, in the case where the model is near the visual point, the detailed model is selected.

In addition, when the model moves at a high speed in the picture plane, the detailed change portions of the model are difficult to be seen. In the case where the moving speed is high as well, therefore, the CG drawing is performed by using the model from which the detailed changes are eliminated. As mentioned above, the model is hierarchically approximated while keeping the characteristic points of the CG model. The CG drawing is performed by selecting the approximated model on a proper hierarchy by judging from the position, size, and moving speed of the model in the picture plane and the target point of the observer.

(6) Description of an embodiment of the invention

Figure 8:
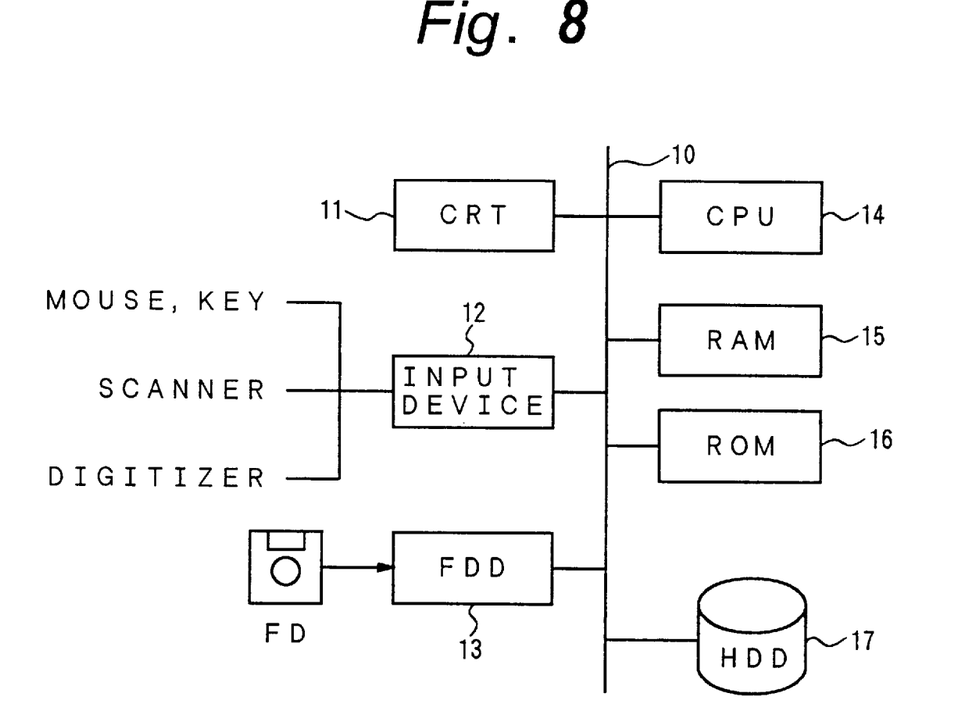
FIG. 8 is a block diagram showing a construction of an embodiment of the invention.

FIG. 8 shows a construction of an embodiment of the invention. The embodiment relates to a case where the foregoing steps are executed by a computer of a standard construction. Reference numeral 10 denotes a bus; 11 a CRT; 12 an input device; and 13 a floppy disk drive. A mouse, a keyboard, a digitizer, an image scanner, or the like can be used as an input device. The CRT 11 and input device 12 are connected to the bus 10. Reference numeral 14 denotes a CPU; 15 an RAM; 16 an ROM; and 17 a hard disk. The CPU 14, RAM 15, ROM 16, and hard disk 17 are connected to the bus 10. The geometric model data which have previously been created, a program which will be described hereinlater, and the like are stored in the hard disk 17.

The image data previously created and stored in the hard disk 17 is supplied to the RAM 15 through the bus 10 and is stored. There is also a case such that data which has previously been created is read out as image data from a floppy disk by the floppy disk drive 13. There is also a case such that the image data is inputted by the input device 12. The image data inputted by the above methods and stored in the RAM 15 is the original geometric model. For example, one solid is drawn by a polygon.

The image data is stored into the RAM 15 and is simultaneously subjected to the spatial filtering process, its outline is extracted, and further characteristic points are extracted in accordance with the foregoing steps S2 to S4. As mentioned above, the above processes are repeated until a desired number of hierarchical approximated models are obtained. The hierarchical approximated models obtained are stored into the RAM 15 together with the original geometric model. Further, the characteristic points of the hierarchical approximated models are made to correspond for every hierarchy by the foregoing process in step S6.

Figure 9:
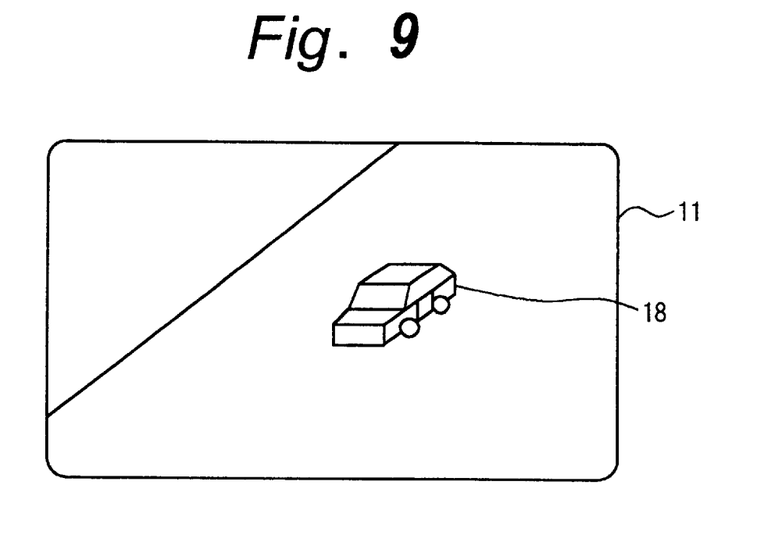
FIG. 9 is a schematic diagram showing a state in which a geometric model is displayed on a CRT.

The geometric model is displayed on the CRT 11 by the process of the CPU 14 according to the program. An example of the display is shown in FIG. 9. Reference numeral 18 denotes such a geometric model. In the display, the model is drawn so that the observer can feel the distance. In FIG. 9, the upper side of the CRT 11 shows a distant position and the lower side shows a near position when it is seen by the observer. In this instance, the geometric model 18 is arranged at a certain position in a virtual space displayed on the CRT 11 and, further, is moved in the space. The geometric model 18 can be arranged and moved not only by a predetermined designation by the program but also by an input from the input device 12.

The CPU 14 checks the position and motion of the geometric model 18 in the foregoing virtual space, selects the hierarchical approximated model of the geometric model which is adapted to the check result from the hierarchical approximated models stored in the RAM 15, and displays the selected model on the CRT 11. In the case where no adaptive hierarchical approximated model exists, the CPU 14 uses the result of the correspondence of the characteristic points among the hierarchies mentioned above, forms the geometric model 18 in which data is interpolated, and displays on the CRT 11. The above procedures are executed, for example, every time the position of the geometric model 18 changes in the foregoing virtual space, or the like.

As mentioned above, according to the invention, there is an effect such that when the CG image is drawn, the position, size, and moving speed of the model in the picture plane and the target point of the observer are considered and the model obtained by hierarchically approximating the original model is selected, so that the CG drawing can be executed at a high speed without largely deteriorating the drawing quality.

In the hierarchical approximation, since the approximation is executed on the basis of the characteristic points of the shape, the feeling of physical disorder is not given to the observer by the approximation. Therefore, there is an effect such that a desire to perform the CG drawing of a high picture quality at a high speed is satisfied.

The present invention is not limited to the foregoing embodiments but many modifications and variations are possible within the spirit and scope of the appended claims of the invention.

What is claimed is:

1. A drawing method of drawing figure data by selectively using a plurality of drawing models obtained from original figure data by using a hierarchical approximating method, comprising the steps of:

inputting figure data representing an image of an object;

creating a plurality of image data sets representing said object, where each of said data sets is based on said figure data and said image data sets vary as to the degree of detail with which said object is represented;

arranging said plurality of image data sets in a hierarchy according to the detail with which said object is represented;

selecting an image data set from said plurality of image data sets; and drawing an image of said object on a display using said selected image data set, wherein the step of creating a plurality of data sets comprises the steps of:

executing a spatial filtering process on said input figure data to generate an image data set; and identifying characteristic points from said image data set, and wherein said step of identifying characteristic points for an image data set is performed for each image data set in said plurality of image data sets;

and said method further comprises matching each characteristic point in each image data set to a corresponding characteristic point in each of the other image data sets of said plurality of image data sets.

2. A method according to claim 1, wherein the step of selecting further comprises selecting an image data set in accordance with a position at which an image of said object is to be drawn on a display.

3. A method according to claim 1, wherein the step of selecting further comprises selecting an image data set in accordance with a size of an image of said object to be drawn on a display.

4. A method according to claim 1, wherein the step of selecting further comprises selecting an image data set in accordance with the distance at which said object is to appear to be located in a displayed picture.

5. A method according to claim 1, wherein in the step of selecting further comprises selecting an image data set in accordance with a moving speed of an image of said object to be drawn in a display picture plane.

6. A method according to claim 1, wherein during the step of drawing an image using said selected image data set, said method further comprises changing said selected image data set and selecting a second image data set from said plurality of image data sets, such that when an image of said object is drawn from said second image data set, said method comprises matching the positions on said display of characteristic points of said second image data set to positions of characteristic points of said previously selected image data set.

7. A method according to claim 1, further comprising varying a cut-off frequency of said spatial filtering process.

8. A drawing method of drawing figure data by selectively using a plurality of drawing models obtained from original figure data by using a hierarchical approximating method, comprising the steps of:

inputting figure data representing an image of an object;

creating a plurality of image data sets representing said object, where each of said data sets is based on said figure data and said image data sets vary as to the degree of detail with which said object is represented;

arranging said plurality of image data sets in a hierarchy according to the detail with which said object is represented;

selecting an image data set from said plurality of image data sets; and drawing an image of said object on a display using said selected image data set, wherein the step of creating a plurality of data sets comprises the steps of executing a spatial filtering process on said input figure data to generate an image data set; and identifying characteristic points from said image data sets, and further comprising classifying the characteristic points into characteristic points located at a vertex of said image of said object and characteristic points located between vertices of said image of said object.

9. A method of generating computer animation comprising displaying an image of an object which image is selected from a plurality of images of said object, wherein said plurality of images of said object vary as to the degree of detail with which said object is depicted, and said image actually displayed is selected from said plurality of images based on the position on a display where the image is to be displayed, wherein the step of creating a plurality of data sets comprises the steps of:

executing a spatial filtering process on said input figure data to generate an image data set; and identifying characteristic points from said image data set, wherein said step of identifying characteristic points for an image data set is performed for each image data set in said plurality of image data sets; and said method further comprises matching each characteristic point in each image data set to a corresponding characteristic point in each of the other image data sets of said plurality of image data sets.

10. An apparatus for drawing figure data by selectively using a plurality of drawing models obtained from original figure data by using a hierarchical approximating method, comprising:

an input device into which figure data representing an image of an object may be input;

a computer connected to said input device for creating a plurality of image data sets representing said object, where each of said data sets is based on said figure data and said image data sets vary as to the degree of detail with which said object is represented;

said computer further arranging said plurality of image data sets in a hierarchy according to the detail with which said object is represented;

said computer further selecting an image data set from said plurality of image data sets; and a display device driven by said computer on which may be drawn an image of said object using said selected image data sets, wherein said computer is programmed to create said plurality of data sets by executing a spatial filtering process on said input figure data to generate an image data set; and identifying; and wherein said computer identifies characteristic points for each image data set in said plurality of image cata sets; and matches each characteristic point in each image data set to a corresponding to a characteristic point in each of the other image data sets of said plurality of image data sets.

11. An apparatus according to claim 10, wherein said computer selects an image data set in accordance with a position at which an image of said object is to be drawn on said display.

12. An apparatus according to claim 10, wherein said computer selects an image data set in accordance with a size of an image of said object to be drawn on said display.

13. An apparatus according to claim 10, wherein said computer selects an image data set in accordance with the distance at which said object is to appear to be located in a displayed picture.

14. An apparatus according to claim 10, wherein said computer selects an image data set in accordance with a moving speed of an image of said object to be drawn in a display picture plane.

15. An apparatus according to claim 10, wherein, while driving said display to draw an image, said computer changes said selected image data set and selects a second image data set from said plurality of image data sets, such that when an image of said object is drawn from said second image data set, said computer matches the positions on said display of characteristic points of said second image data set to positions of characteristic points of said previously selected image data set.

16. An apparatus according to claim 10, further comprising means for varying a cut-off frequency of said spatial filtering process.

17. An apparatus for drawing figure data by selectively using a plurality of drawing models obtained from original figure data by using a hierarchical approximating method, comprising:

an input device into which figure data representing an image of an object may be input;

a computer connected to said input device for creating a plurality of image data sets representing said object, where each of said data sets is based on said figure data and said image data sets vary as to the degree of detail with which said object is represented;

said computer further arranging said plurality of image data sets in a hierarchy according to the detail with which said object is represented;

said computer further arranging said plurality of image data sets in a hierarchy according to the detail with which said object is represented;

said computer further selecting an image data set from said plurality of image data sets; and a display device driven by said computer on which may be drawn an image of said object using said selected image data set; and wherein said computer is programmed to create said plurality of data sets by executing a spatial filtering process on said input figure data to generate an image data set; and identifying characteristic points from said image data set, said computer further classifies said characteristic points into characteristic points located at a vertex of said image of said object and characteristic points located between vertices of said image of said object.

18. An apparatus for generating computer animation comprising:
   a memory unit for storing data representing a plurality of images of an object, wherein said plurality of images of said object vary as to the degree of detail with which said object is depicted;
   a display for displaying an image of said object which image is selected from said plurality of images of said object; and
   a computer for selecting the image to be displayed from among said plurality of images based on the position on said display where the image is to be displayed,
   wherein said computer is programmed to create said plurality of data sets by executing a spatial filtering process on said input figure data to generate an image data set; and identifying characteristic points from said image data set; and wherein, while driving said display to draw an image, said computer changes said selected image data set and selects a second image data set from said plurality of image data sets, such that when an image of said object is drawn from said second image data set, said computer matches the positions on said display of characteristic points of said second image data set to positions of characteristic points of said previously selected image data set.

19. A method of generating a plurality of drawing models obtained from original figure data by using a hierarchical approximating method, the method comprising the steps of:
   receiving figure data representing an image of an object;
   creating a plurality of image data sets representing said object, where each of said data sets is based on said figure data and said image data sets vary as to the degree of detail with which said object is represented; and
   arranging said plurality of image data sets in a hierarchy according to the detail with which said object is represented;
   wherein the step of creating a plurality of data sets comprises the steps of:
      executing a spatial filtering process on said figure data received to generate an image data set; and
      identifying characteristics points from said image data set; and
      wherein the step of identifying characteristics points for an image data set is performed for each image data set in said plurality of image data sets; and
      said method further comprises matching each characteristic point in each image data set to a corresponding characteristic point in each of the other image data sets of said plurality of image data sets.

20. An apparatus for generating a plurality of drawing models obtained from original figure data by using a hierarchical approximating method, the apparatus comprising:
   a receiving device for receiving figure data representing an image of an object;
   a creating device for creating a plurality of image data sets representing said object, where each of said data sets is based on said figure data and said image data sets vary as to the degree of detail with which said object is represented; and
   an arranging device for arranging said plurality of image data sets in a hierarchy according to the detail with which said object is represented;
   wherein said creating device comprises:
      an executing device for executing a spatial filtering process on said figure data received to generate an image data set; and
      an identifying device for identifying characteristic points from said image data set; and
      wherein said identifying device identifies characteristic points for each image data set in said plurality of image data sets; and
      said apparatus further comprises a matching device for matching each characteristic point in each image data set to a corresponding characteristic point in each of the other image data sets of said plurality of image data sets.

21. A program storage device readable by a machine embodying a program of instructions executable by the machine to perform method steps for generating a plurality of drawing models obtained from original figure data by using a hierarchical approximating method, the method steps comprising:
   receiving figure data representing an image of an object;
   creating a plurality of image data sets representing said object, where each of said data sets is based on said figure data and said image data sets vary as to the degree of detail with which said object is represented; and
   arranging said plurality of image data sets in a hierarchy according to the detail with which said object is represented,
   wherein the step of creating a plurality of data sets comprises the steps of:
      executing a spatial filtering process on said figure data received to generate an image data set; and
      identifying characteristic points from said image data set; and
      wherein the step of identifying characteristics points for an image data set is performed for each image data set in said plurality of image data sets; and
      said method further comprises matching each characteristic point in each image data set to a corresponding characteristic point in each of the other image data sets of said plurality of image data sets.

* * * * *